Patented Feb. 8, 1949

2,461,492

UNITED STATES PATENT OFFICE 2,461,492

PRODUCTION OF ACRYLONITRILE

Erwin L. Carpenter, Riverside, and Harold S. Davis, Greenwich, Conn., assignors to American Cyanamid Company, New York, N. Y., a corporation of Maine No Drawing. Application March 19, 1946, Serial No. 655,610

2 Claims. (Cl. 260—465.9)

The present invention relates to the production of acrylonitrile. Specifically, the invention is concerned with a method of dehydrating ethylene cyanohydrin, under the influence of heat and a catalyst, which assures high yields of acrylonitrile at lower cost and with less difficulty than by the methods known heretofore.

It is known according to the prior art that acrylonitrile may be obtained by heating ethylene cyanohydrin in contact with such materials as acid sulfates, zinc chloride, silica gel, metallic tin and tin compounds. Although these substances apparently catalyze the reaction, the rate of dehydration is relatively slow and the yield of acrylonitrile based on the ethylene cyanohydrin is not satisfactory.

It has now been discovered that acrylonitrile may be readily obtained in high yields by heating ethylene cyanohydrin in the presence of an alkali forming metal salt of an organic acid as a catalyst.

Compounds which may be employed as catalysts in the dehydration reaction include the alkali forming metal salts and magnesium salts of organic acids such as, for example, sodium formate, potassium acetate, sodium acetate, magnesium acetate, calcium oleate, sodium stearate, barium oxalate, magnesium oxalate, potassium succinate, potassium phthalate, sodium benzoate and the like. The alkali forming metal salts and magnesium salts of organic acids are herein referred to for convenience as alkali forming metal salts of organic acids.

A preferred method of operation comprises adding the ethylene cyanohydrin in liquid phase to the catalyst heated to an ethylene cyanohydrin dehydration temperature that is within the range of from about 160° C. to about 275° C., and preferably from about 200° C. to 240° C.

As the ethylene cyanohydrin is added to the catalyst maintained at the dehydration reaction temperature, a fluid melt results. The fact that the mass is fluid is of decided advantage since very good contact and mixing with the added cyanohydrin is continuously obtained. This minimizes over-heating and the formation of polymers and/or other decomposition products, thereby resulting in higher yields of acrylonitrile.

As a result of the heating as above indicated, water is catalytically removed from the ethylene cyanohydrin to form acrylonitrile. The acrylonitrile and water distill over and can be condensed as a stratifiable distillate from which the acrylonitrile may be recovered. By placing a fractionating column between the mass of catalyst and the take-off for the acrylonitrile-water mixture, unchanged cyanohydrin may be returned to the dehydration zone. The presence of undehydrated cyanohydrin at this point may be minimized by feeding the ethylene cyanohydrin to the dehydrating zone only as fast as it can be dehydrated.

The alkali forming metal salts of organic acids have been found to be superior catalysts for this purpose as they have a long life, produce minimum quantities of decomposition products, may be readily flushed from the apparatus with water when spent, and do not give rise to corrosion difficulties in the equipment.

The following examples, in which the parts are by weight, further illustrate the invention.

Example 1

20 parts of potassium acetate were placed in a reaction vessel equipped with a stirrer, dropping funnel and distillation column, the lower part of which served as a fractionating column and thus returned unchanged cyanohydrin to the catalyst. The vessel was heated in a bath maintained at a temperature of 210° C. to 220° C. 69.5 parts of ethylene cyanohydrin were added dropwise to the catalyst with stirring at a rate of 0.7 part per minute. A distillate of acrylonitrile and water (formed in the dehydration reaction) was collected from the distillation column. The distillate separated into two layers, a lower water layer and an upper acrylonitrile layer which upon redistillation gave 45.5 parts of acrylonitrile. The production rate of acrylonitrile during the addition of the ethylene cyanohydrin was approximately 0.5 part per minute. An additional 3.6 parts of acrylonitrile were distilled from the catalyst after the addition of the ethylene cyanohydrin was completed, thus giving a total of 49.1 parts of acrylonitrile, a 95% yield.

Example 2

The potassium acetate catalyst from Example 1 was again used to dehydrate 258 parts of ethylene cyanohydrin fed in at the rate of 0.8 part per minute. The rate of production of acrylonitrile was approximately 0.6 part per minute. An additional 10 parts of acrylonitrile were distilled from the catalyst after the addition of the ethylene cyanohydrin was completed. 200 parts (96.3% yield) of acrylonitrile were obtained.

Example 3

Ethylene cyanohydrin was fed to the potassium acetate catalyst from Example 2 at the rate of 1.6 parts per minute during a period of 43 minutes.

33.8 parts of acrylonitrile were obtained during this period, a production rate of 0.8 parts per minute. An additional 13.6 parts of acrylonitrile were obtained from the liquid catalyst, giving a total yield of 91.5%. The over-all yield of acrylonitrile for the above three runs was 95%.

Example 4

60 parts of sodium formate were placed in the dehydration vessel employed in Example 1. The vessel was heated in a bath maintained at a temperature of 210° C. to 220° C. 976 parts of ethylene cyanohydrin were added dropwise to the catalyst with stirring at a rate of 1.7 parts per minute. A distillate of acrylonitrile and water (formed in the dehydration reaction) was collected from the distillation column. The production rate of acrylonitrile during the addition of the ethylene cyanohydrin was approximately 1.3 parts per minute, 716 parts of acrylonitrile being collected. An additional 4 parts of acrylonitrile were distilled from the catalyst after the addition of the ethylene cyanohydrin was completed, thus giving a total of 720 parts of acrylonitrile, a 98.8% yield.

Example 5

20 parts of sodium acetate were stirred and heated at 220° C. to 245° C. 69.5 parts of ethylene cyanohydrin were added to the catalyst at the rate of 0.93 part per minute. Acrylonitrile was obtained at the rate of 0.52 part per minute, the total yield being 94%.

Example 6

20 parts of sodium stearate powder were stirred and heated at 210° C. to 235° C. in the dehydration vessel employed in Example 1 while 139 parts of ethylene cyanohydrin were fed into the catalyst at the rate of 1.74 parts per minute. Acrylonitrile was produced at the rate of 1.07 parts per minute. 94.5 parts (91% yield) of acrylonitrile were obtained.

The following examples illustrate the lower yields of acrylonitrile obtained when inorganic compounds having an alkaline reaction are used as catalysts.

Example 7

20 parts of calcium hydroxide powder were heated at 215° C. to 220° C. in the dehydration vessel employed in Example 1. 69.5 parts of ethylene cyanohydrin were added dropwise to the stirred catalyst during a period of 70 minutes. The production rate of acrylonitrile during the addition of the ethylene cyanohydrin was approximately 0.66 part per minute, giving 40 parts of acrylonitrile. An additional 2 parts of acrylonitrile were distilled from the catalyst after the addition of the ethylene cyanohydrin was completed, thus giving a total of 42 parts, an 80% yield.

Example 8

20 parts of magnesium oxide powder were stirred and heated at 220° C. to 230° C. in the dehydration vessel employed in Example 1. 69.5 parts of ethylene cyanohydrin were added gradually to the catalyst during a period of 57 minutes. The rate of production of acrylonitrile during the addition of the ethylene cyanohydrin was approximately 0.62 part per minute. An additional 9.3 parts of acrylonitrile were distilled from the catalyst after the addition of the ethylene cyanohydrin was completed. A total of 44.3 parts (85% yield) of acrylonitrile was obtained.

Example 9

A mixture consisting of 250 parts of ethylene cyanohydrin and 20 parts of anhydrous sodium borate was stirred and heated at 190° C. to 210° C. in the dehydration vessel employed in Example 1. As acrylonitrile and water were evolved, more ethylene cyanohydrin was added dropwise to maintain between 150–250 parts of the cyanohydrin in the vessel. The addition of ethylene cyanohydrin was stopped at the end of four hours, at which point a total of 1172 parts had been added. The run was continued for another hour to complete the dehydration of the remaining cyanohydrin. The yield of acrylonitrile was 76%.

While the invention has been described with particular reference to specific embodiments, it is to be understood that it is not to be limited thereto but is to be construed broadly and restricted solely by the scope of the appended claims.

We claim:

1. A method of producing acrylonitrile which includes feeding ethylene cyanohydrin in liquid phase to a dehydrating zone heated to a temperature range of from 160° C. to 275° C., said zone containing an alkali forming metal salt of an organic acid as an ethylene cyanohydrin dehydration catalyst, removing acrylonitrile and water from said zone, and recovering the acrylonitrile.

2. The method of claim 1 in which the catalyst is potassium acetate.

ERWIN L. CARPENTER.
HAROLD S. DAVIS.

REFERENCES CITED

The following references are of record in the file of this patent:

UNITED STATES PATENTS

| Number | Name | Date |
|---|---|---|
| 1,858,151 | Gorham | May 10, 1932 |
| 2,082,000 | Haney | June 1, 1937 |
| 2,356,247 | Kirk | Aug. 22, 1944 |
| 2,374,051 | Spence | Apr. 17, 1945 |
| 2,375,005 | Kung | May 1, 1945 |
| 2,389,607 | Britton et al. | Nov. 27, 1945 |
| 2,392,303 | Balear | Jan. 8, 1946 |

FOREIGN PATENTS

| Number | Country | Date |
|---|---|---|
| 496,372 | Germany | Apr. 24, 1930 |
| 510,712 | Germany | Oct. 22, 1930 |